INVENTOR.
ALBERT C. DOLBEC
BY

Dec. 22, 1970   A. C. DOLBEC   3,549,981
STATIC EXCITER FIELD SUPPRESSOR
Filed Aug. 1, 1968   3 Sheets-Sheet 3

INVENTOR.
ALBERT C. DOLBEC
BY

United States Patent Office

3,549,981
Patented Dec. 22, 1970

3,549,981
STATIC EXCITER FIELD SUPPRESSOR
Albert C. Dolbec, Afton, Va., assignor to General Electric Company, a corporation of New York
Filed Aug. 1, 1968, Ser. No. 749,369
Int. Cl. H02p 9/32
U.S. Cl. 322—25                                    5 Claims

ABSTRACT OF THE DISCLOSURE

The output of an AC generator is suppressed by a saturable current transformer which controls generator field excitation. A saturating winding on the current transformer is energized by a control circuit which suppresses the generator field voltage to near zero thus collapsing the generator output voltage.

BACKGROUND OF THE INVENTION

The invention is in the field of static exciters for AC generators. While it has been well known in the past that the suppression of the output of a static exciter could be accomplished by providing circuit breakers in the output or field circuit of a static exciter, such circuit breakers have been costly, slow in their operation, and far from maintenance free.

A typical field excitation system of the rectified alternating current type comprises a rectifier bridge between the field winding of the generator and a source of alternating current. A low reactance power potential transformer is used to supply alternating current to the rectifier proportional to the general terminal voltage and, a saturable current transformer is used to provide alternating current to the rectifier propotional to the altenator load current. The saturable current transformer is provided with a direct current saturating winding which controls the output of the exciter by saturating the current transformer during a part of each cycle of the generator terminal voltage. Circuit breakers in the generator field circuit are opened in response to emergency conditions sensed at the generator output terminals by, for example, a series of differential relays. The reduction of the field voltage to zero results in the collapse of the generator terminal voltage.

SUMMARY OF THE INVENTION

The present invention obviates the need for circuit breakers in the generator field circuit by providing the saturable current transformer with a direct current saturating winding used as a suppression winding. With a high value direct current applied to the suppression winding, the current transformer saturates causing the field voltage to decrease to a value near zero and the generator terminal voltage to collapse. The application of a DC current to the saturating winding is controlled by a switch which may be actuated either manually or in response to an emergency condition sensed in the system.

BRIEF DESCRIPTION OF THE DRAWINGS

The objects and other features of the invention can be better understood from the detailed description of two exemplary embodiments shown in the drawings, in which.

DETAILED DESCRIPTION OF DRAWINGS

Figure 1:
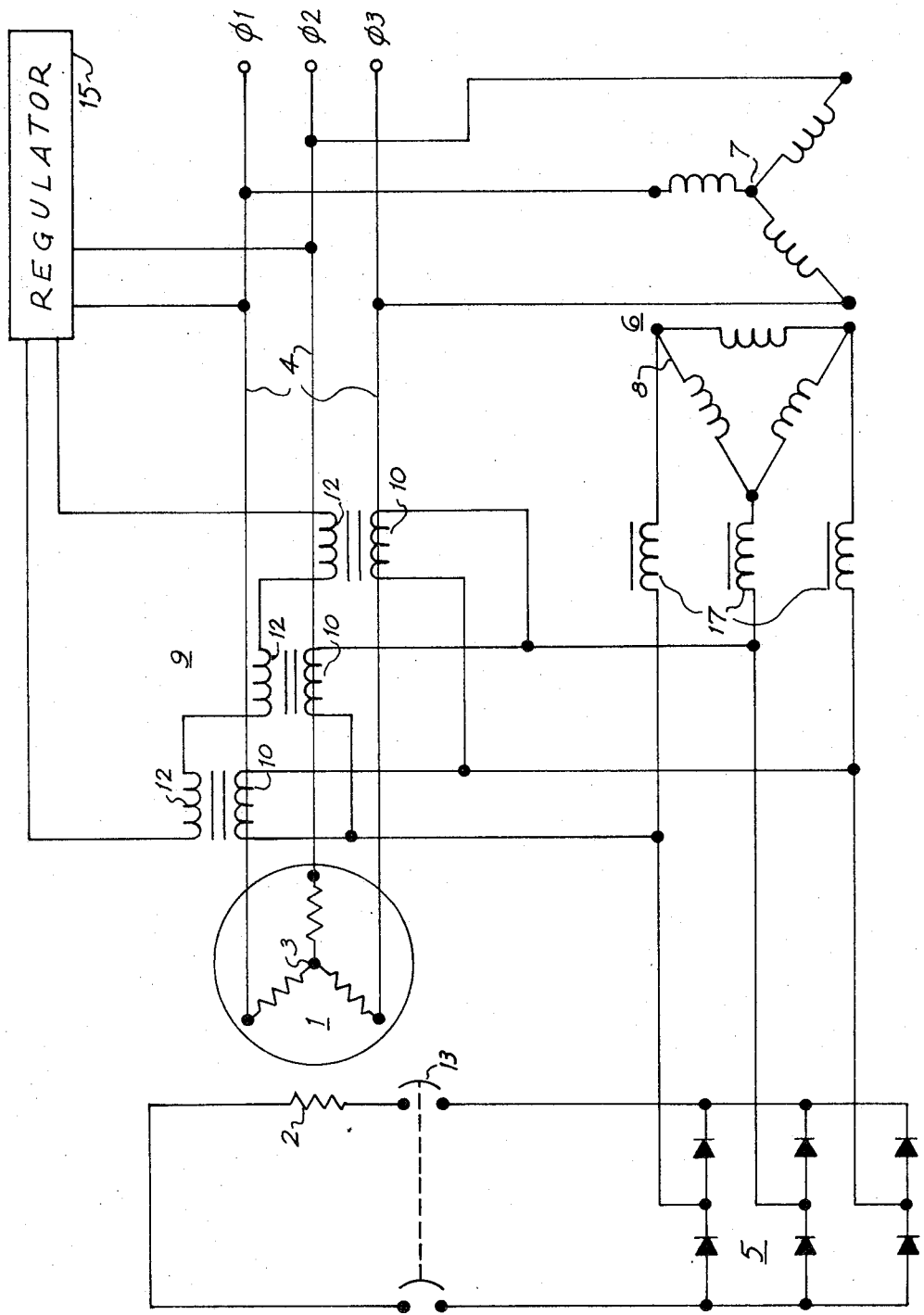
FIG. 1 is a block diagram of a prior art generator excitation system.

Referring now to the drawing and more particularly to FIG. 1, there is shown a static generator excitation system of the prior art, comprising a three phase synchronous generator 1 having a conventional rotating field winding 2 and armature windings 3 connected to supply alternating current energy to an external load or power system through the line conductors 4. The synchronous generator 1 is arranged to be driven at a comparatively constant speed by any suitable form of prime mover (not shown). Energizing current for the field winding 2 of the generator is supplied from the output terminals of the three phase full wave rectifier bridge, shown generally at 5.

The alternating current energy that is supplied to the input terminals of the rectifier bridge 5 is composed of two components. The first component is proportional to the generator terminal voltage and is supplied from the potential transformer 6 which has a Y-connected primary winding 7 connected to the output circuit 4 of the generator and a delta-connected secondary winding 8 connected to the input terminals of the rectifier bridge 5 via linear reactors 17.

The rectifier 5 is thus supplied with alternating current energy varying directly with the output voltage of the generator 1, and the generator field excitation is progressively increased during conditions of increasing terminal voltage. The second component is proportional to generator output or load current and is supplied to the rectifier bridge 5 by the current transformer 9. The latter transformer is shown diagrammatically as being of the type wherein the primary winding is a straight section of the conductor 4 carrying the load current. The secondary winding 10 is connected to the input terminals of the rectifier bridge and in parallel with the secondary windings 8 of the potential transformer 6.

The transformer 6 is of the low reactance type having linear reactors 17 placed in series with the secondary windings of the potential transformer 6 to prevent feedback from the current transformer 9. The effective impedance of the circuit looking back towards the secondary windings 8 is increased by the presence of these reactors and exceeds the input impedance of the rectifier bridge 5. However, feedback control is inherently present if a high reactance potential transformer is used for the transformer 6.

Since the energy supplied to the rectifier bridge 5 is composed of a component proportional to generator terminal voltage and also a component proportional to generator load current, it will be evident that the field excitation will be varied in accordance with both voltage and current conditions existing in the output circuit of the generator, and thus will be automatically corrected for variations in either one from the predetermined standard.

In operation of the system it has been found advisable to adjust the outputs of the voltage transformer 6 and the current transformers 9 to provide a field current slightly greater than that required to hold normal voltage on the synchronous generator 1, and then provide auxiliary means for regulating the field excitation current more closely about the desired level. This is accomplished by the saturating winding 12 on the current transformers 9. The saturating winding 12 is supplied with a direct current that varies in direct proportion to the alternator output voltage. Any suitable form of conventional voltage regulator may be used to supply the voltage proportional saturating current to the windings 12. As an example of a suitable regulator, a simple form of carbon pile voltage regulator having a carbon pile may be placed in series with a source of direct current and with the saturating windings 12 of the current transformers 9.

Variations in current in the winding 12 will change the amount of saturation present in the core of the current transformer 9, thereby changing its impedance or effectively changing the ratio of transformation in the transformer.

As in the case previously mentioned, an increase in generator terminal voltage effects an increase in saturating current in the windings 12, thereby decreasing the impedance of the current transformers 9 and causing a reduction in output of the current transformers 9. The increase in saturation is analogous to removal of the magnetic core from the transformer, thereby reducing the coupling and consequently greatly reducing the output of the current transformer secondary winding 10. The reduced current transformer output results in reduced input to the rectifier bridge 5 and a proportional decrease in direct exciting current to the field winding 2 of the generator. With this type of saturable current transformer control very close voltage regulation may be held on the synchronous generator since the system is inherently regulated by means of the current and voltage response to a point near the desired level, and the final adjustment is then accomplished by means of the variations in saturation of the current transformers 9.

A circuit breaker 13 is shown in circuit between the rectifier 5 and the field winding 2. Circuit breaker 13 is of the conventional type which is opened usually as a result of an emergency or fault condition sensed in the generator itself, the transformers, or the prime mover. While simple in construction, the circuit breaker carries full excitation current and therefore is required to have a high current rating. This results in large size and cost for such components. In addition, experience has shown that these devices are slow in operation and far from being maintenance free.

Figure 2:
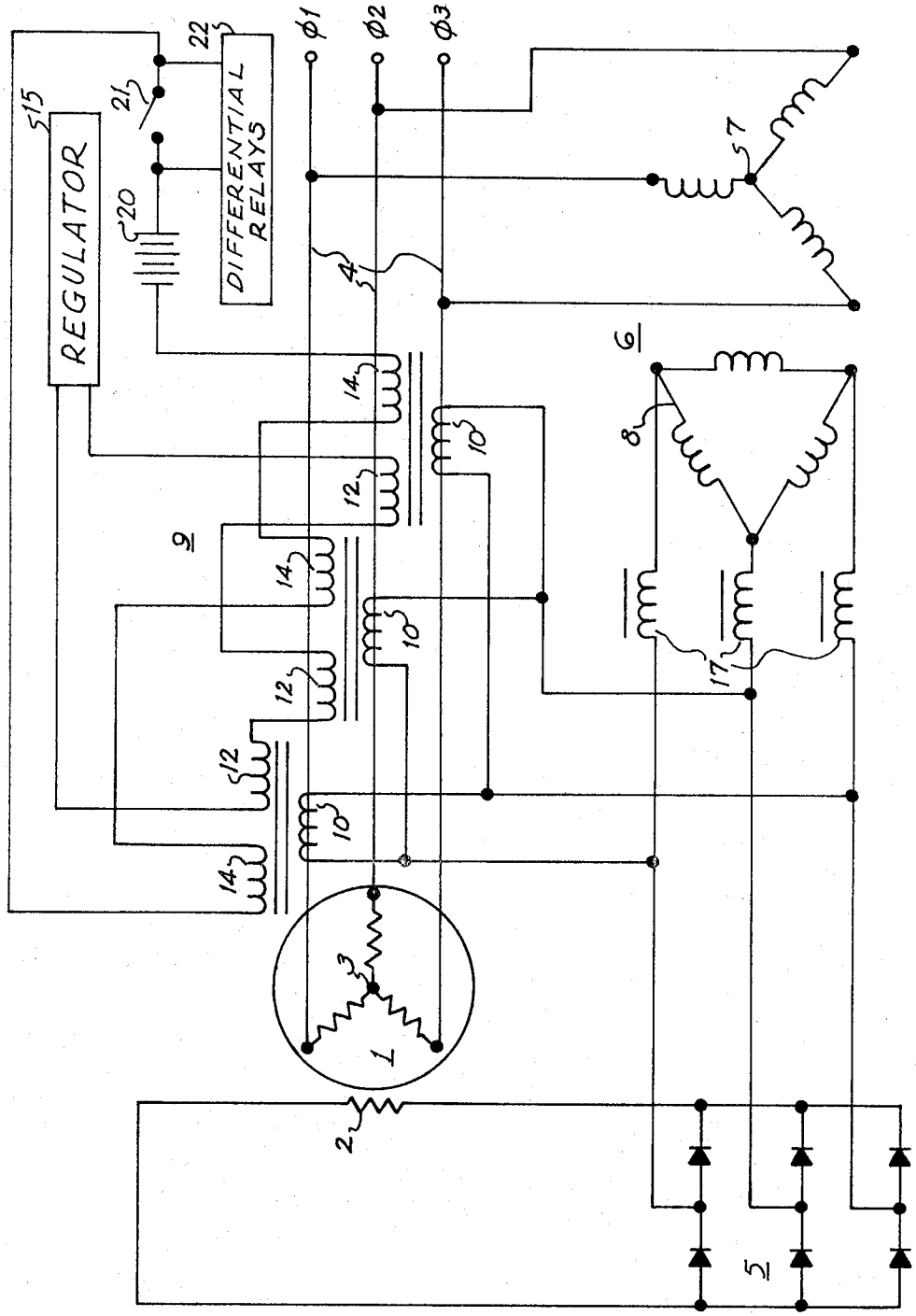
FIG. 2 is a block diagram of one embodiment of a field suppression system according to the invention; and, FIG. 3 is a block diagram of another embodiment of a field suppression system according to the invention.
Figure 3:
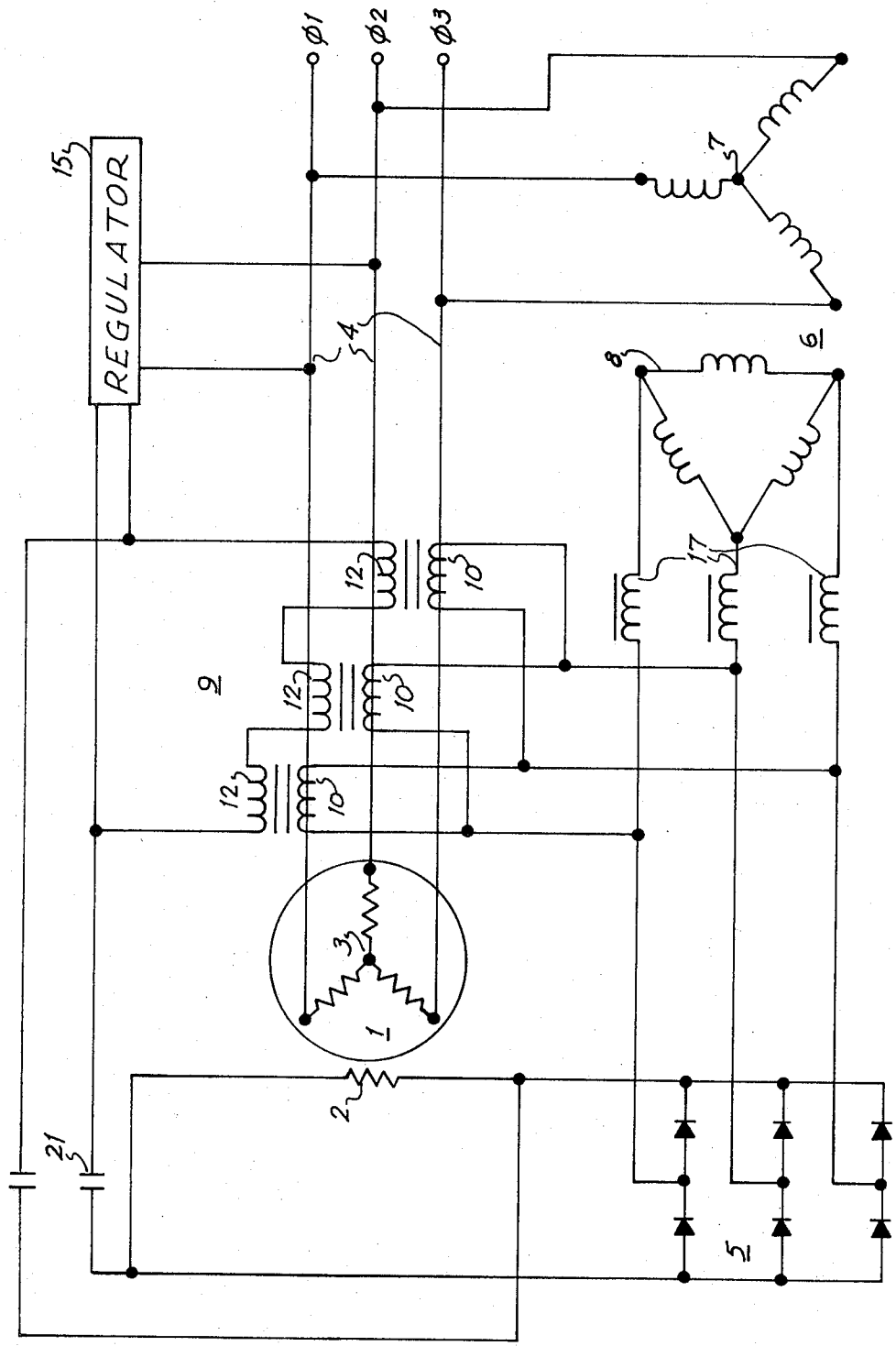

The system of FIG. 2, which illustrates a preferred embodiment of the present invention, completely eliminates the field winding circuit breaker. In FIGS. 1, 2 and 3 like numerals refer to like elements of the drawings.

As can be seen from FIG. 2, the saturable current transformers 9 contain a second direct current saturating winding 14 which is used as a suppression winding. The second saturating windings 14 are connected in series with a source 20 of direct current and either a manually operated switch 21 or a device shown generally at 22 which senses emergency conditions which may arise in the circuit necessitating an immediate shutdown of the generator. For example, differential relays could be used to sense fault conditions in the power transformer (transformer differential trip) or in the generator (generator differential trip). Also, other devices could be used which sense prime mover overspeed or an outbreak of fire in or around any of the components of the system. There are many devices or systems known in the art which operate to sense conditions necessitating a generator shutdown, and such devices may be used as the emergency sensing means for closing switch 21.

If an emergency condition is sensed by any of the foregoing means, a high amplitude direct current from source 20 is applied to the second saturating winding 14 on the current transformers 9. This current is large enough so that the transformer becomes fully saturated thereby causing decoupling within the current transformers 9. As a result, the voltage across the secondary windings 10 of transformers 9 reduces substantially to zero thereby removing current from the field winding 2. In the absence of current in the field 2, the generator output voltage collapses. Since the emergency condition causes collapse of the generator output voltage by way of saturating the current transformers 9, the need for a circuit breaker has been obviated.

FIG. 3 shows an alternative embodiment of the invention. Here battery 21 has been replaced by a direct connection to the rectifier 5 so that the suppression supply is the source of generator excitation itself. The field suppression closing switch 21 is shown as normally open contacts controlled by the switch controlling device 22 (not shown in FIG. 3). It is also noted that the regulating winding 12 is used here for suppression as well as regulation. This dual junction can be accomplished by the single winding for each phase of the generator output since suppression is merely a matter of degree. The suppression current is substantially greater than the energization supplied to windings 12 for regulation purposes.

While not shown in FIG. 3, greater suppression voltage can be obtained by coupling to the AC side of rectifier 5 through a step-up transformer and separate rectifier.

It is noted that while the single suppression-regulation winding scheme shown in FIG. 3 is simpler and less expensive, it is less reliable than the use of individual windings for the two functions.

It is more desirable to use a separate or second saturating winding such as 14 for the reason that a single saturating winding, if it is open or burned out, will leave the system without protection.

Although specific examples of the invention are described herein in connection with a three phase generator, it will be apparent to any one of ordinary skill in the art to which the invention pertains that the invention is also applicable to generators having other than three phase output.

From the foregoing, it will be seen that we have provided a system for suppressing the field of a static exciter which is simple in construction, less expensive than conventionally used circuit breakers, and highly reliable in its operation.

What is claimed and desired to be secured by Letters Patent of the United States is:

1. In a static exciter for an AC generator of the type having a field winding, a rectifier for supplying direct current tot he field winding, a potential transformer for providing one portion of the excitation to said rectifier input dependent upon the generator terminal voltage, a saturable current transformer for providing the second portion of the excitation to said rectifier input dependent upon the generator output current, the improvement comprising:
   (a) a saturating winding on said current transformer,
   (b) means for substantially reducing the rectifier input voltage to zero comprising further means for connecting a direct current to said saturating winding large enough to saturate said current transformer.

2. In a static exciter for an AC generator of the type having a field winding, a rectifier for supplying direct current to the field winding, a potential transformer for providing one portion of the excitation to said rectifier input dependent upon the generator terminal voltage, a saturable current transformer for providing the remainder of the excitation to said rectifier input dependent upon the generator output current, a saturating winding on the saturable current transformer for regulating the saturable current transformer output, the improvement comprising:
   (a) a second saturating winding on said current transformer,
   (b) means for supplying a direct current to said second saturating winding large enough to saturate said current transformer whereby the rectifier input voltage is reduced to substantially zero.

3. In a static exciter according to claim 2, wherein said means for supplying a direct current to said second saturating winding comprises, a source of direct current, a switch in series with said second saturating winding and said source, and means for closing said switch in response to an emergency condition sensed.

4. In a static exciter for an AC generator of the type having a field winding, a rectifier for supplying direct current to the field winding, a potential transformer for providing essentially a no-load portion of the excitation to said rectifier input dependent upon the generator terminal voltage, a saturable current transformer responsive to the magnitude of said generator terminal voltage for providing essentially the load portion of the excitation to said rectifier input dependent upon the generator output current, a saturating winding on said current transformer, means for substantially reducing the rectifier input voltage to zero comprising further means for connecting a direct current to said saturating winding large enough to saturate said current transformer and reduce the generator output terminal voltage to zero.

5. An arrangement according to claim 4 wherein said further means comprises means coupled to said rectifier for applying a direct current to said saturating winding for saturating said current transformer.

References Cited

UNITED STATES PATENTS 2,454,582  11/1948  Thompson et al. _____ 322—25

ORIS L. RADER, Primary Examiner

H. HUBERFELD, Assistant Examiner

U.S. Cl. X.R.

322—27, 28, 59